US 6,678,990 B2
Jan. 20, 2004

(54) TROLLING DEVICE

(76) Inventor: Glen R. Cox, 531 Teton, Burley, ID (US) 83318

(*) Notice: Subject to any disclaimer, the term of this patent is extended or adjusted under 35 U.S.C. 154(b) by 0 days.

(21) Appl. No.: 10/139,865

(22) Filed: May 6, 2002

(65) Prior Publication Data

US 2003/0204985 A1 Nov. 6, 2003

(51) Int. Cl.⁷ ............................................... A01K 91/00
(52) U.S. Cl. ......................... 43/19.2; 43/26.1; 114/255
(58) Field of Search .............................. 43/19.2, 26.1, 43/27.2, 27.4; 114/244, 245, 255

(56) References Cited

U.S. PATENT DOCUMENTS

| 4,120,112 A | | 10/1978 | McBain | 43/19.2 |
|---|---|---|---|---|
| 4,204,356 A | * | 5/1980 | Smith | 43/43.13 |
| 4,509,287 A | * | 4/1985 | Hood | 43/19.2 |
| 4,726,315 A | * | 2/1988 | Bell | 114/244 |
| 4,793,088 A | | 12/1988 | Fortuna | 43/27.4 |
| 4,798,021 A | * | 1/1989 | Miklos | 43/19.2 |
| 4,875,428 A | * | 10/1989 | Schlesch | 114/255 |
| 4,890,409 A | | 1/1990 | Morgan et al. | 43/15 |
| 4,903,428 A | * | 2/1990 | Sluiter | 43/26.1 |
| 5,056,255 A | | 10/1991 | Campbell | 43/19.2 |
| 5,140,928 A | * | 8/1992 | Frick | 144/255 |
| 5,154,016 A | | 10/1992 | Fedora et al. | 43/26.1 |
| 5,185,950 A | * | 2/1993 | Hood | 43/19.2 |
| 5,412,898 A | | 5/1995 | Crains | 43/19.2 |
| 5,499,469 A | | 3/1996 | Guillemette | 43/16 |
| 5,581,932 A | | 12/1996 | Bell | 43/26.1 |
| 5,595,013 A | * | 1/1997 | Dubriske | 43/19.2 |
| 5,595,134 A | * | 1/1997 | Pete | 114/244 |
| 5,752,461 A | * | 5/1998 | Whisenhunt | 114/253 |
| 5,894,691 A | | 4/1999 | Zepeda, Sr. | 43/17 |
| 5,930,938 A | | 8/1999 | De Fraties et al. | 43/15 |
| 5,943,808 A | | 8/1999 | Bryant | 43/17 |

* cited by examiner

Primary Examiner—Kurt Brown
(74) Attorney, Agent, or Firm—Robert L. Shaver; Frank J. Dykas; Stephen M. Nipper

(57) ABSTRACT

Claimed is a trolling device for use on a moving boat. The trolling device utilizes a continuous looped guide groove, which spirals around a driveshaft, and has a connecting loop that joins the first spiral with a second spiral that then travels back down the driveshaft to a second connecting loop. As the driveshaft continuously rotates in one direction, a travel pin with an attached fishing lure moves back and forth along the driveshaft. One or more speed change zones are incorporated into the driveshaft as regions of changed pitch in the spiral guide grove. The speed change zones result in the speed of the lure changing as it passes through the water, so that the lure will have an occasional burst of speed, and then slow down during its travel through the water.

14 Claims, 6 Drawing Sheets

TROLLING DEVICE

BACKGROUND OF THE INVENTION

1. Field of the Invention

The present invention generally relates to fishing devices, and more particularly relates to trolling devices for fishing from a moving boat.

2. Background Information

Trolling for fish from a moving boat is a common and productive method of catching fish. The simplest way to perform this activity is for a person with a conventional fishing pole to sit in a boat as the boat moves slowly through the water. A number of devices are patented which are directed toward trolling type activities. Some of these involve dropping a fishing line over the side of a stationary boat and lowering the line vertically into the water. When a fish is caught, it is reeled into the boat. Other devices are directed at trolling from a moving boat. Some of these devices are devices for carrying one or more fishing lines into a lateral position from the boat, so that more than one fishing line can be spread out over an area behind the boat.

One theory of fishing is that trolling from a moving boat is more productive if the speed of the moving lure or bait changes. The speed change will cause a following fish to strike at a lure as if the lure were a prey fish, and its burst of speed would allow it to escape. This speed change when trolling is commonly achieved by changing the speed of retrieval or using the pole to pull the lure faster through the water during retrieval using a conventional fishing pole from a boat. What is lacking in the prior art is a mechanized way to troll from a moving boat using conventional fishing poles. What is also lacking is a mechanized way to impart a speed change to the lure or bait being towed through the water. Therefore, it is an object of the present invention to provide a trolling device for trolling behind a moving boat. It is also an object to provide a trolling device which utilizes a conventional fishing rod and reel. It is another object of the invention to provide a trolling device which imparts one or more speed changes to the lure being towed.

SUMMARY OF THE INVENTION

These and other objects are achieved in the trolling device of the present invention. The trolling device of the present invention is designed for use on a moving boat. The trolling device moves in one direction and then in another direction, on an axis generally parallel with the long axis of the boat. The trolling device utilizes a reciprocating assembly for motion in a first direction, towards the bow of the boat, and in a second direction towards the stern of the boat. Attached to the reciprocating assembly is a fishing tackle assembly which has a first end and a second end. As the reciprocating assembly moves back and forth on the boat, the fishing tackle assembly, since it is attached to the reciprocating assembly, also moves back and forth. The first end of the fishing tackle assembly extends into a body of water and has attached to it fishing gear such as hooks, lures and bait, for catching fish. The second end of the fishing tackle attaches to the fishing tackle assembly and is configured for retrieval with a retrieval system. This trolling device is made for use with a boat moving through water at a certain speed. If the speed of the boat through the water remains constant, the travel of the reciprocating assembly back and forth on the boat will cause the hook or lure being dragged behind the boat to move at speeds different than the speed of the boat, depending on whether it is moving backwards or forwards in relation to the boat. The fishing tackle assembly can be a conventional fishing rod and reel, attached by a mount to the reciprocating assembly.

The trolling device can also be configured so that it moves in the first direction at a different speed than it moves in a second direction. The rate of speed can also be variable so that the user can control the rate of speed of the fishing tackle first end through the water.

One manner of achieving the travel of the reciprocating assembly in a first and second direction is by the use of a driveshaft which moves the reciprocating assembly back and forth. The driveshaft includes a spiral guide which drives the reciprocating assembly back and forth as the driveshaft rotates. As noted above, the fishing tackle assembly can be comprised of a conventional fishing rod and reel with line on the reel and a lure, hook, or bait on the end of the line and comprising the first end of the fishing tackle assembly.

The spiral guide of the driveshaft can be a guide groove which is a depression defined in the driveshaft itself. The reciprocating assembly can thus further include a travel pin which is configured for an interfitting relationship with the guide groove so that as the guide shaft rotates, the travel pin remains fixed on one side of the driveshaft and travels backwards or forwards in the guide grooves in the first direction and the second direction. In such a configuration, the travel pin is attached to the fishing tackle assembly, and these together form the reciprocating assembly of the trolling device.

The spiral guide can move the reciprocating assembly in a first direction and second direction by turning the driveshaft for a period of time and then reversing the direction of rotation of the driveshaft. This would cause the travel pin and the attached fishing tackle assembly to move in one direction and then to reverse direction and move in the other direction. This reversal of rotation can be achieved by limit switches, or by gearing. The spiral guide can also be formed in the shape of a forward and reverse spiral which are linked together at a first end and a second end of the driveshaft. Thus, the forward and reverse spirals form one continuous looped guide groove. With this arrangement, the driveshaft can rotate continuously in one direction and the travel pin and the attached fishing tackle assembly will travel alternately in the first direction and then the second direction. When it reaches the end of the forward spiral, it enters the loop which feeds it automatically into the reverse spiral and the travel pin and the fishing tackle assembly travel to the opposite end of the driveshaft and enter a second loop which connects the reverse spiral with the forward spiral. In this way, the driveshaft can rotate in one direction continuously and the fishing tackle assembly moves back and forth.

An additional feature of the device is a speed change zone either in the forward or reverse loops, or both of them. The speed change zones can be a portion of the continuous looped guide groove which is set at a different pitch than other portions. The typical position for this speed change zone would be in the middle of the driveshaft in either the forward or reverse loop or both of these loops. With the driveshaft rotating at a constant speed, when the travel pin attached to the reciprocating assembly and the fishing tackle assembly enters the speed change zone, it would have more lineal feet of guide groove to follow before it moved on down the driveshaft. This feature would induce one or more speed changes to the action of the lure in the water. If the speed change zone were in the reverse loop, the speed of the lure in the water would slow down, and would approximate the speed of the boat. If the speed change zone were in the forward loop, the lure would slow down when in the speed change zone and then speed up again as it left the speed change zone. This extra action on the lure is designed to entice fish to aggressively attack the lure. The continuous looped guide groove can also have more than one speed change zones, and the speed change zones can be to speed up as well as to slow down the rate of travel of the fishing tackle assembly.

In one configuration of the device, the reciprocating assembly is enclosed within a box with a rod mount, and a conventional fishing rod and reel is attached to the rod mount so that it is enclosed in the box as the reciprocating assembly, and moves back and forth within the box. The driveshaft can be powered by a direct drive motor and it can also utilize a motor with speed reduction gears. The motor could be electrical, hydraulic, or based on any conventional type of power plant. Either a direct drive of a reduction gear motor can be set to operate with a continuous rotation in one direction, and/or optional reversing of direction. The rate of travel of the reciprocating assembly can be further adjusted by changing the speed of the motor.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive.

DESCRIPTION OF THE PREFERRED EMBODIMENTS

Figure 1:
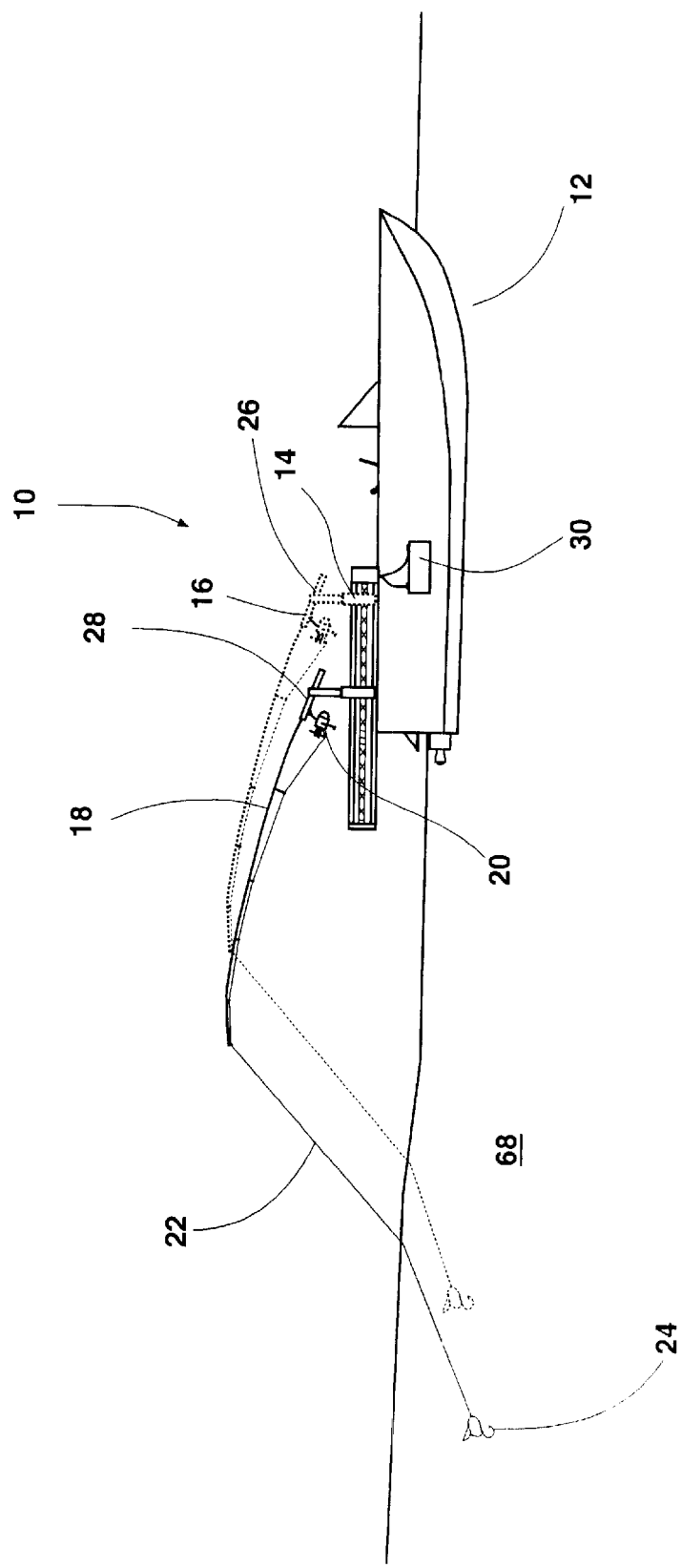
FIG. 1 is a side view of the trolling device in use on a boat.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

A preferred embodiment of the invention is shown in FIGS. 1 through 7. FIG. 1 shows one configuration of the trolling device 10 mounted on a boat 12. Also shown is the reciprocating assembly 14 and the fishing tackle assembly 16. In the example shown, the fishing tackle assembly 16 is comprised of a conventional fishing rod 18 and a conventional fishing reel 20. The fishing tackle assembly 16 also comprises fishing line 22 and a fishing lure 24. The reciprocating assembly 14 moves generally parallel with the long axis of the boat, in other words, forward and aft on the boat. It travels between a forward position 26 and an aft position 28. In FIG. 1, the forward position 26 is shown in dotted lines, while the aft position 28 is shown as solid lines. Also shown in FIG. 1 is a battery 30 which serves to power the device. The motor of the device would be sized according to the particular size and configuration of a trolling device, and could be electric, hydraulic, or driven by any conventional power system. For a trolling device with a driveshaft 48 inches in length, a suitable motor is a $\frac{1}{5}^{th}$ horsepower motor, driven by a 12-volt battery.

Figure 2:
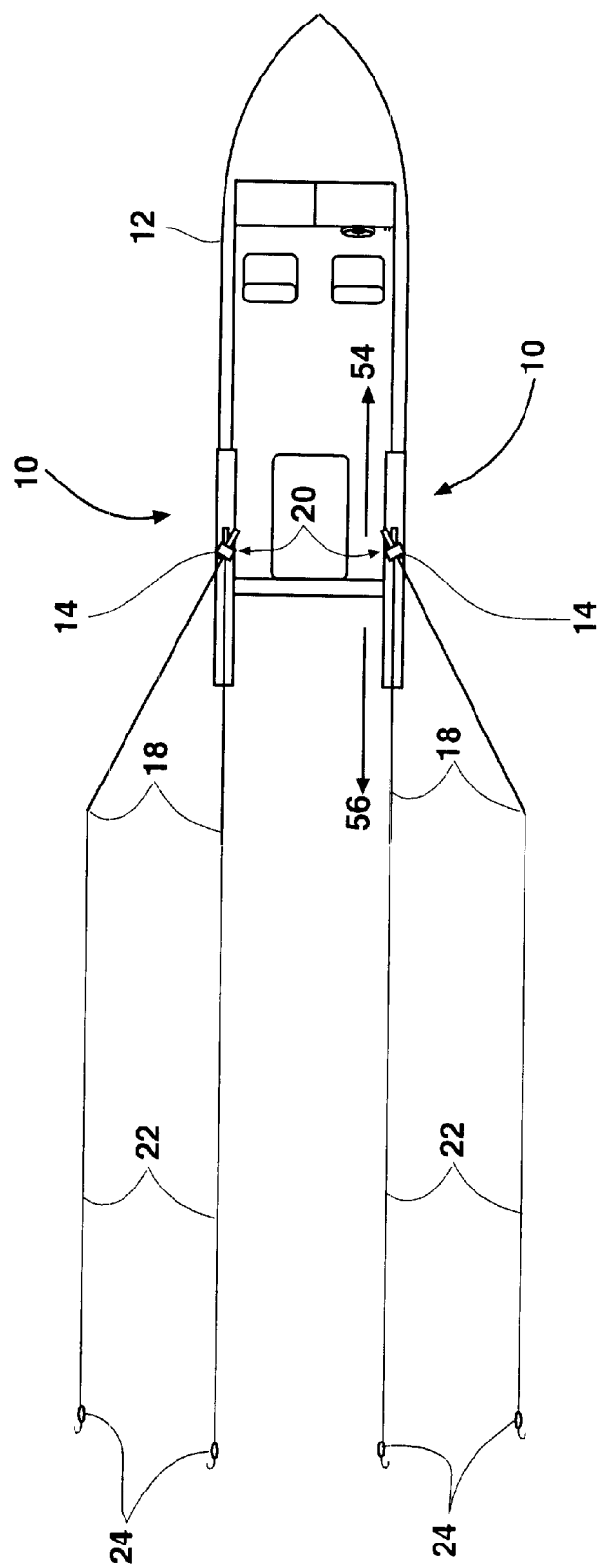
FIG. 2 is a top view of the trolling device in use on a boat.

FIG. 2 shows a top view of a boat 12 with two trolling devices 10 of the invention mounted on the boat. The reciprocating assemblies 14 travel in a first direction 54 and a second direction 56 as the boat moves through the water. The reciprocating assemblies shown include a rod mount 60 and conventional fishing rods and reels. Shown in FIG. 2 are two fishing tackle assemblies associated with each reciprocating assembly 14. One, two, or more fishing tackle assemblies can be associated with one reciprocating assembly.

Figure 3:
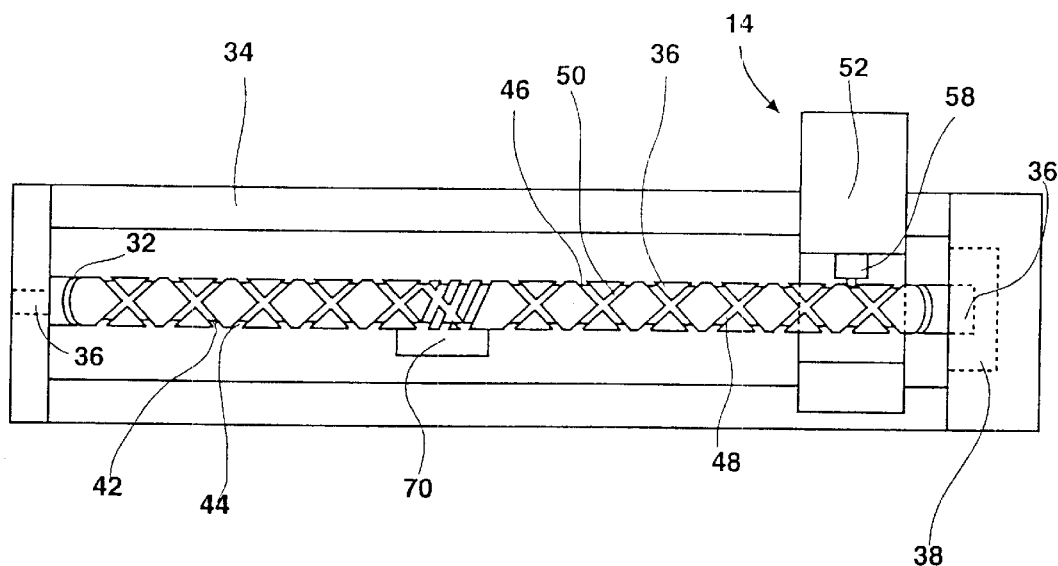
FIG. 3 is a cutaway side view of the driveshaft of the trolling device.
Figure 6:
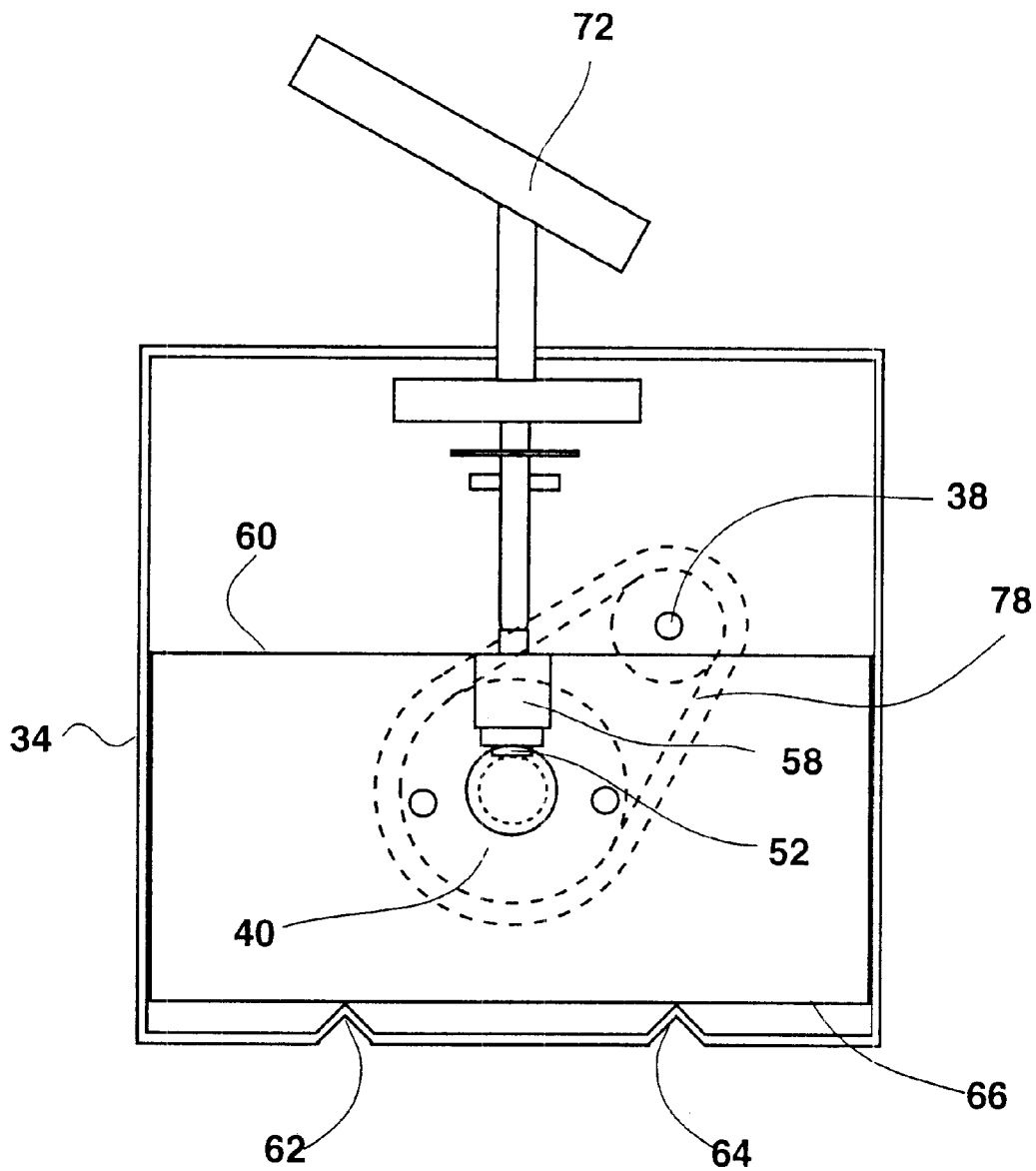
FIG. 6 is an end view of the trolling device, showing a motor and reducing gears.

FIG. 3 shows a closer view of one preferred embodiment of the invention. Shown is a driveshaft 32 mounted within an enclosure 34. Driveshaft 32 is supported by a bearing 36 at either end of the shaft. At one end of the driveshaft 32 is a motor 38. In FIG. 3, the motor is shown as a direct drive motor, but a motor with gears 40 for speed reduction is also suitable and is shown in FIG. 6. The driveshaft 32 includes a spiral guide 42, which comprises a guide groove 44. The guide groove is best seen in FIG. 3, and in this embodiment is an incised groove in the driveshaft 32. The guide groove can take a number of forms including a spiral which extends from one end of the shaft to the other. The spiral guide can also be a raised rail which is attached to and circumvolves the driveshaft 32. It can also be a groove incised into the driveshaft 32. The incised version of the spiral guide is called a guide groove. The driveshaft is preferably made of Delrin®, but any suitable material could be used. The size of the driveshaft and the configuration of the spiral groove can be tailored to a particular application, but a configuration which works well is a driveshaft which is 1¼ inches in diameter, and 36 inches long. The guide groove for this particular size of shaft is 7/32 inches wide, and 3/16 inches deep.

In one preferred embodiment of the invention, the guide groove 44 is formed into a continuous looped guide groove 46, as shown in FIG. 3. In this configuration of the device, the continuous looped guide groove 46 forms one continuous channel which links a forward spiral 48 and a reverse spiral 50 to form the continuous loop. The design shown includes a speed change zone 70, in which the pitch of the guide groove 46 changes. A speed change can also be achieved by a change in speed of the rotation of the motor, to accomplish the same result. Both the reverse and forward spirals 50 and 48 could have more than one speed change zone 70.

Figure 4:
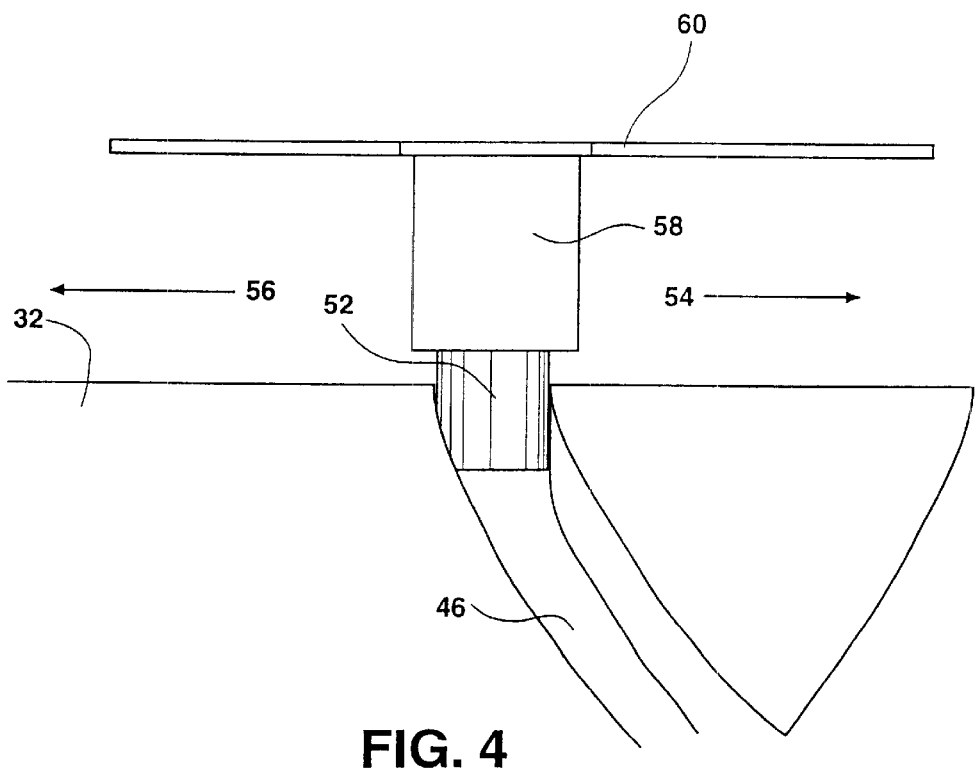
FIG. 4 is a detailed side view of the travel pin and the driveshaft and a spiral groove on the driveshaft.
Figure 7:
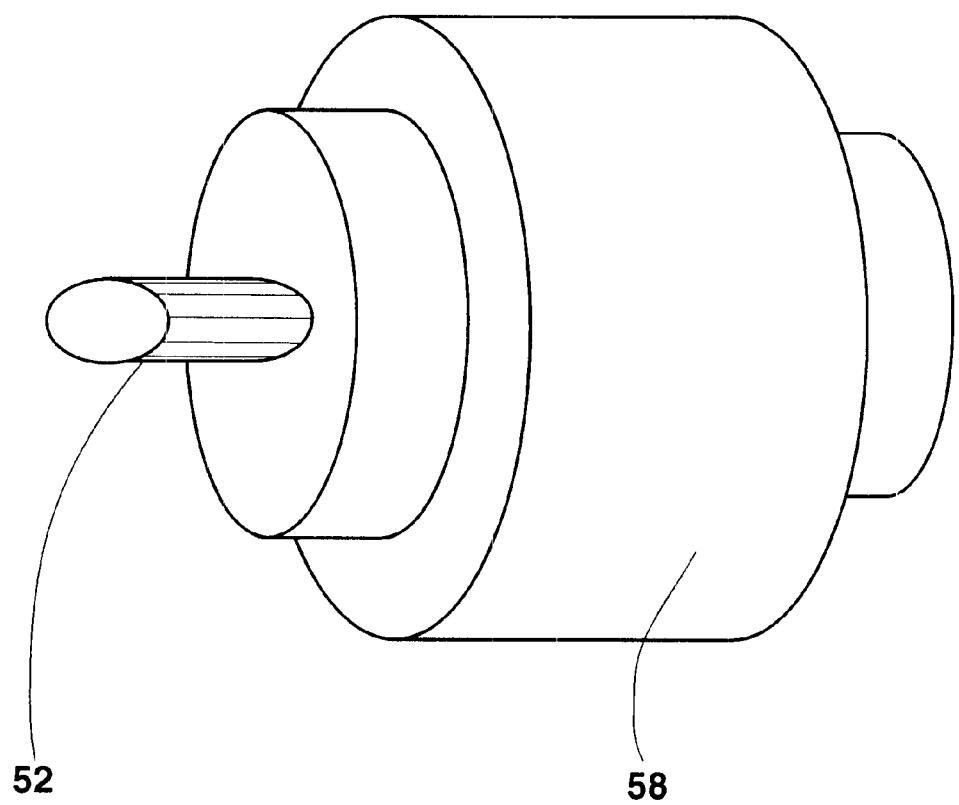
FIG. 7 is a perspective view of the travel pin.

Shown in FIG. 4 is a travel pin 52 which is mounted to the reciprocating assembly 14 above the driveshaft 32, and which interfits with the continuous looped guide groove 46. As shown in FIG. 3, when the driveshaft 32 rotates, the travel pin 52 is pushed in a first direction 54 or a second direction 56. Travel pin 52 is attached to a swivel head 58, which allows the travel pin 52 to rotate as it moves through the continuous looped guide groove 46. The swivel head 58 is attached to a plate 60 which is part of the reciprocating assembly 14. In the preferred embodiment, the travel pin 52 is made of 304 stainless steel, but other materials would also be appropriate. As shown in FIG. 4 and FIG. 7, the travel pin 52 is generally oval shaped in cross section, a shape which enables it to follow the channel provided by the guide groove 46.

Figure 5:
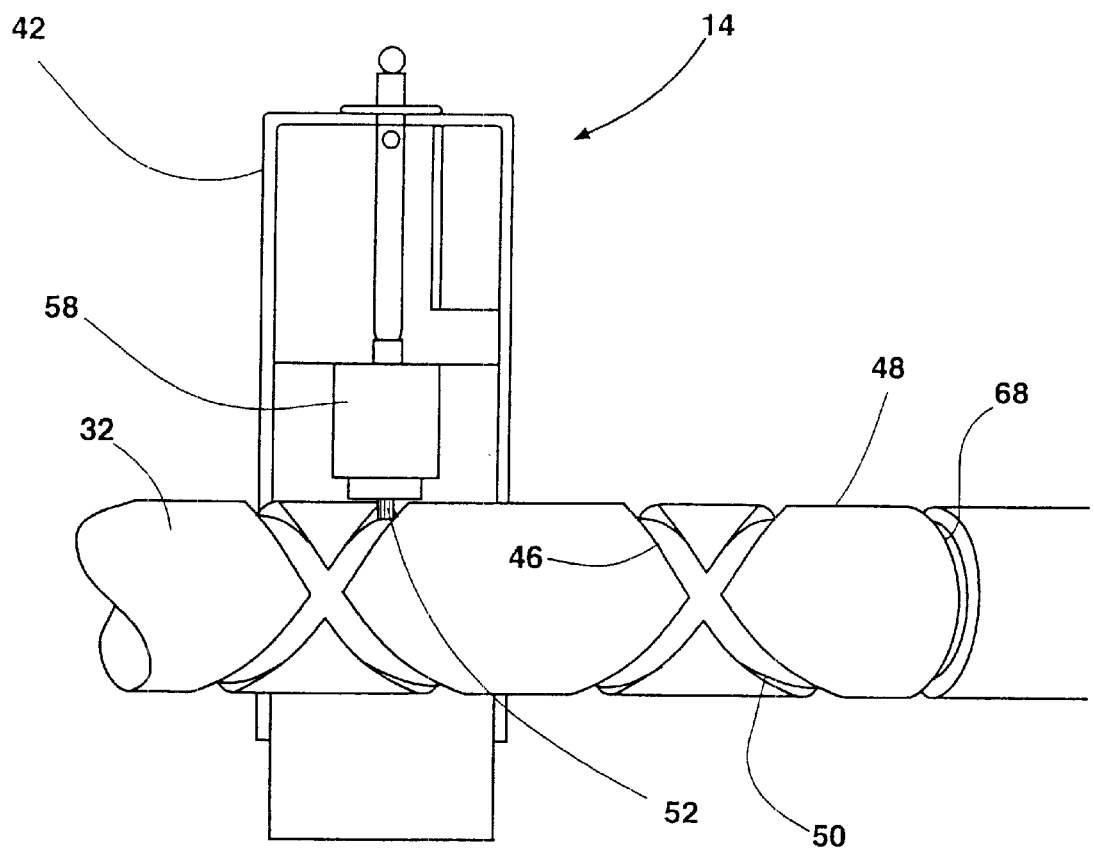
FIG. 5 is a cutaway side view of the driveshaft and the reciprocating assembly of the trolling device.

FIG. 5 shows additional details of the reciprocating assembly 14. It is mounted above the driveshaft 32, which includes a forward spiral 48 and a reverse spiral 50, which are linked together and together form continuous looped guide groove 46. A connecting loop 68 connects the forward spiral 48 and the reverse spiral 50. One connecting loop is present at each of the ends of the driveshaft 32.

FIG. 6 shows an end view of the reciprocating assembly 14. In this particular configuration of the invention, the enclosure 34 includes a first ridge 62 and a second ridge 64 on the bottom surface of the enclosure 34. Resting on top of the first ridge 62 and the second ridge 64 is an internal housing 66. Internal housing 66 fits snugly between the side walls of the enclosure 34 and also rests on top of the first ridge 62 and the second ridge 64. The plate 60 is connected to, or integral with the top of the internal housing 66. The travel pin 52 is mounted to plate 60, on the swivel head 58. As driveshaft 32 rotates, the reciprocating assembly 14 moves back and forth on the driveshaft, by the enclosure 34 moving sliding on top of the first ridge and 62 and the second ridge 64.

FIG. 6 shows the drive mechanism as a motor 38 and gear 40, driven by a belt or chains 74 from the motor 38. Shown in FIG. 6 is a rod holder 72, in which a conventional rod and reel can be mounted. Other line retrieving assemblies can be utilized.

While there is shown and described the present preferred embodiment of the invention, it is to be distinctly understood that this invention is not limited thereto but may be variously embodied to practice within the scope of the following claims.

From the foregoing description, it will be apparent that various changes may be made without departing from the spirit and scope of the invention as defined by the following claims.

I claim:

1. A trolling device for use with a boat, said boat for traveling on water and having a long axis, in which said trolling device comprises:

a reciprocating assembly comprising a driveshaft with a spiral guide groove defined in said driveshaft, said spiral guide groove comprising a forward spiral and a reverse spiral, linked together at a first end and a second end of said driveshaft to form one continuous looped guide groove, so that as said driveshaft rotates in one direction, said travel pin and said attached fishing tackle assembly travels alternately in said first direction and then in said second direction on said driveshaft;

a travel pin which is configured for interfitting relationship with said guide groove, so that as said driveshaft rotates, said travel pin moves with said guide groove in said first direction and said second direction, thus moving said fishing tackle assembly alternately in said first direction and said second direction parallel to said long axis of said moving boat; and said fishing tackle assembly having a first end and a second end, said first end of said fishing tackle assembly extending into a body of water for fishing, and said second end of said fishing tackle attached to said reciprocating assembly;

whereas a reciprocating motion of said reciprocating assembly causes said first end of said fishing tackle assembly to move through said water at a speed determined by a rate of travel of said reciprocating assembly in relation to a speed of said moving boat.

2. The trolling device of claim 1 in which said continuous looped guide groove in said driveshaft circumvolves said driveshaft at a first pitch, and said continuous looped guide groove includes a speed change zone in which said continuous guide groove circumvolves said driveshaft at a second pitch, so that said fishing tackle assembly moves at a different speed when passing through said speed change zone.

3. The trolling device of claim 1 in which said continuous looped guide groove includes a first speed change zone in said forward spiral and a second speed change zone in said reverse spiral.

4. The trolling device of claim 1 in which said continuous looped guide groove includes a plurality of said speed changes zones.

5. The trolling device of claim 4 in which said continuous looped guide groove comprises a plurality of said speed change zones in said forward spiral or said reverse spiral.

6. The trolling device of claim 1 which further includes a direct drive motor for said driveshaft.

7. The trolling device of claim 1 which further includes a motor and speed reduction gears for said driveshaft.

8. A trolling device for use with a boat, said boat for traveling on water and having a long axis, in which said trolling device comprises:

a reciprocating assembly which is attached to said boat, a driveshaft with a spiral guide groove defined in said driveshaft, said spiral guide groove comprising a forward spiral and a reverse spiral, linked together at a first end and a second end of said driveshaft to form one continuous looped guide groove, for moving said fishing tackle assembly alternately in said first direction and said second direction, and said reciprocating assembly further including a travel pin which is configured for interfitting relationship with said guide groove, so that as said driveshaft rotates, said travel pin moves so that as said driveshaft rotates in one direction, said travel pin and said attached fishing tackle assembly travels alternately in said first direction and then in said second direction on said driveshaft, with said fishing tackle assembly moving in a first direction and in a second direction parallel to said long axis of said moving boat; and said fishing tackle assembly having a first end and a second end, said fishing tackle assembly mounted to said reciprocating assembly, and moved in said first direction and in said second direction by said reciprocating assembly, said first end of said fishing tackle assembly extending into a body of water for fishing, and said second end of said fishing tackle attached to said reciprocating assembly;

whereas a reciprocating motion of said reciprocating assembly, causes said first end of said fishing tackle assembly to move through said water at a speed determined by a rate of travel of said reciprocating assembly in relation to a speed of said moving boat.

9. The trolling device of claim 8 in which said continuous looped guide groove in said driveshaft circumvolves said driveshaft at a first pitch, and said continuous looped guide groove includes a speed change zone in which said continuous guide groove circumvolves said driveshaft at a second pitch, so that said fishing tackle assembly moves at a different speed when passing through said speed change zone.

10. The trolling device of claim 9 in which said continuous looped guide groove includes a first speed change zone in said forward spiral and a second speed change zone in said reverse spiral.

11. The trolling device of claim 9 in which said continuous looped guide groove includes a plurality of said speed changes zones.

12. The trolling device of claim 9 in which said continuous looped guide groove comprises a plurality of said speed change zones in said forward spiral or said reverse spiral.

13. The trolling device of claim 8 which further includes a direct drive motor for said driveshaft.

14. The trolling device of claim 8 which further includes a motor and speed reduction gears for said driveshaft.

* * * * *